United States Patent
Jin et al.

(10) Patent No.: US 9,930,321 B2
(45) Date of Patent: Mar. 27, 2018

(54) STEREOSCOPIC IMAGE DISPLAY DEVICE

(71) Applicant: LG Display Co., Ltd., Seoul (KR)

(72) Inventors: You-Yong Jin, Seoul (KR); Hoon Kang, Goyang-si (KR); Byung Joo Lee, Seoul (KR); Jung Eun Son, Paju-si (KR); Hoon Ki Kim, Incheon (KR); Ju Hoon Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 147 days.

(21) Appl. No.: 14/536,907

(22) Filed: Nov. 10, 2014

(65) Prior Publication Data

US 2015/0189258 A1 Jul. 2, 2015

(30) Foreign Application Priority Data

Dec. 31, 2013 (KR) .......................... 10-2013-0168553

(51) Int. Cl.
*H04N 13/00* (2006.01)
*H04N 13/04* (2006.01)

(52) U.S. Cl.
CPC .............................. *H04N 13/0404* (2013.01)

(58) Field of Classification Search
CPC .................................................. H04N 13/0404
USPC .......................................................... 348/59
See application file for complete search history.

(56) References Cited

U.S. PATENT DOCUMENTS

| 5,833,507 | A | | 11/1998 | Woodgate et al. |
| 6,023,315 | A | * | 2/2000 | Harrold .............. G02B 27/2214 348/E13.004 |
| 2005/0105179 | A1 | * | 5/2005 | Taira .................. H04N 13/0404 359/463 |
| 2007/0121076 | A1 | * | 5/2007 | Klippstein ........... G02B 27/225 353/30 |
| 2008/0043092 | A1 | * | 2/2008 | Evans ................ G02B 27/2214 348/36 |
| 2008/0136901 | A1 | | 6/2008 | Schwerdtner |
| 2011/0127506 | A1 | * | 6/2011 | So ........................ H01L 27/3213 257/40 |
| 2012/0229452 | A1 | * | 9/2012 | Yoon .................. H04N 13/0404 345/419 |
| 2012/0229718 | A1 | * | 9/2012 | Huang ................. G02B 3/0075 349/15 |

FOREIGN PATENT DOCUMENTS

| CN | 101103636 A | 1/2008 |
| CN | 102193200 A | 9/2011 |

OTHER PUBLICATIONS

Chinese Office Action dated Sep. 9, 2016, in Chinese Patent Application No. 201410818179.1.

* cited by examiner

*Primary Examiner* — Jeffery Williams
(74) *Attorney, Agent, or Firm* — Morgan, Lewis & Bockius LLP (57) ABSTRACT

A stereoscopic image display device for displaying a 3D stereoscopic image includes a substrate having an array of pixels thereon; and a lenticular film on the substrate, wherein alternating rows of pixels are shifted so that open areas of pixels in adjacent rows are not overlapped with respect to the vertical direction.

5 Claims, 8 Drawing Sheets

FIG. 1

Related Art

FIG. 2

Related Art

FIG. 3

Related Art

| Simulation Conditions | |
|---|---|
| Number of Views | 8view |
| 3D Resolution | 960*1080 |
| Lens Angle | 0 |
| View Width | 65mm |
| Viewing Distance | 2.55m |
| Rear Distance | 3.09mm(+2.14mm) |
| Simulation Result | |
| 3D crosstalk | 0 |
| LD | 0 |

STEREOSCOPIC IMAGE DISPLAY DEVICE

CROSS-REFERENCE TO RELATED APPLICATIONS

This application claims the benefit of the Korean Patent Application No. 10-2013-0168553 filed on Dec. 31, 2013, which is hereby incorporated by reference as if fully set forth herein.

BACKGROUND OF THE INVENTION

Field of the Invention

The present invention relates to a glasses-free three-dimensional (3D) display device that displays a 3D image as a multi-view by using a lenticular film, and more particularly, to a stereoscopic image display device that prevents 3D crosstalk from occurring, and enables a lenticular film to be freely bent.

Discussion of the Related Art

As users' demand increases for realistic images to be displayed, stereoscopic image display devices that display a 3D image as well as a 2D image have been developed. 2D image display devices have been greatly advanced in terms of a quality of a display image such as a resolution and a viewing angle, but have a limitation in that the 2D image display devices cannot display depth information of an image because of displaying a 2D image. On the other hand, 3D image display devices display a 3D stereoscopic image instead of a 2D planar image, thereby fully transferring the original 3D information to a user. In comparison with existing 2D image display devices, 3D image display devices display a far more vivid and realistic stereoscopic image.

The 3D image display devices are generally categorized into 3D glasses display devices, which use special 3D glasses, and glasses-free 3D display devices, which do not use special 3D glasses. The glasses-free 3D display devices provide a three-dimensionality of an image to a viewer using a binocular disparity, where the glasses-free 3D display devices provide images that are generally the same as those provided with 3D glasses display devices. However, since the glasses-free 3D display devices do not require any special 3D glasses, the glasses-free 3D display devices are differentiated from the 3D glasses display devices.

Figure 1:
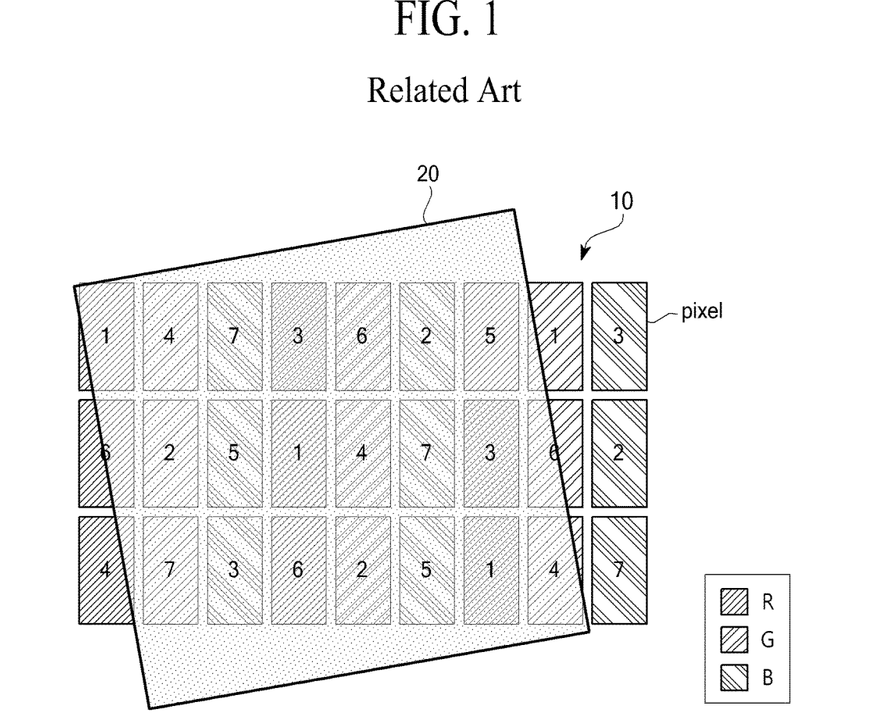
FIGS. 1 and 2 are diagrams illustrating a method of realizing a multi-view in a related art glasses-free 3D display device.
Figure 2:
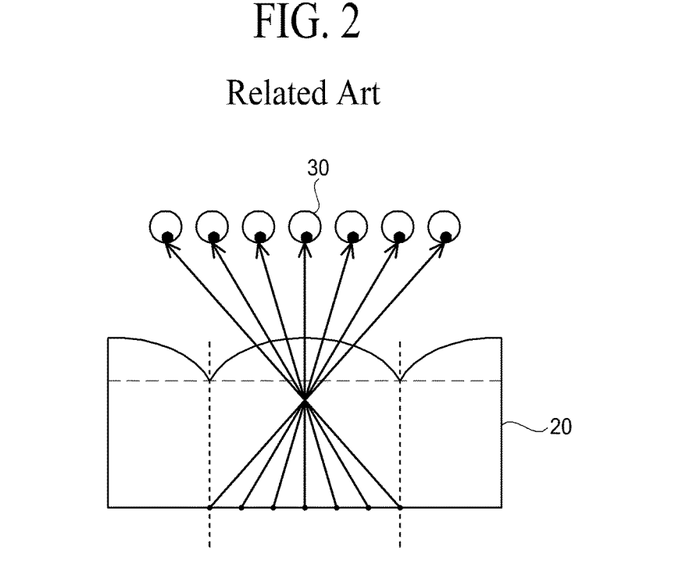

FIGS. 1 and 2 are diagrams illustrating a method of realizing a multi-view in a related art glasses-free 3D display device.

As illustrated in FIGS. 1 and 2, in the related art glasses-free 3D display device, a display panel in which R, G, and B pixels are arranged in a matrix type displays an image, and a lenticular film 20 is disposed on the display panel 10, thereby enabling a user to view a 3D image as a multi-view.

An image is divided and displayed using N number of pixels in one pitch of a lenticular lens, thereby enabling a viewer 30 to view a 3D image at N number of viewpoints. When the viewer 30 is located at a predetermined view position, different images are projected onto left and right eyes of the viewer 30 so that the viewer 30 feels three-dimensionality due to a binocular disparity.

In such lenticular 3D display devices, a resolution of a 3D image is reduced in proportion to the number of multi-views, and even when viewing a 2D image, a resolution is reduced to 1/N. For this reason, a quality of an image is degraded when viewing a 2D image.

Figure 3:
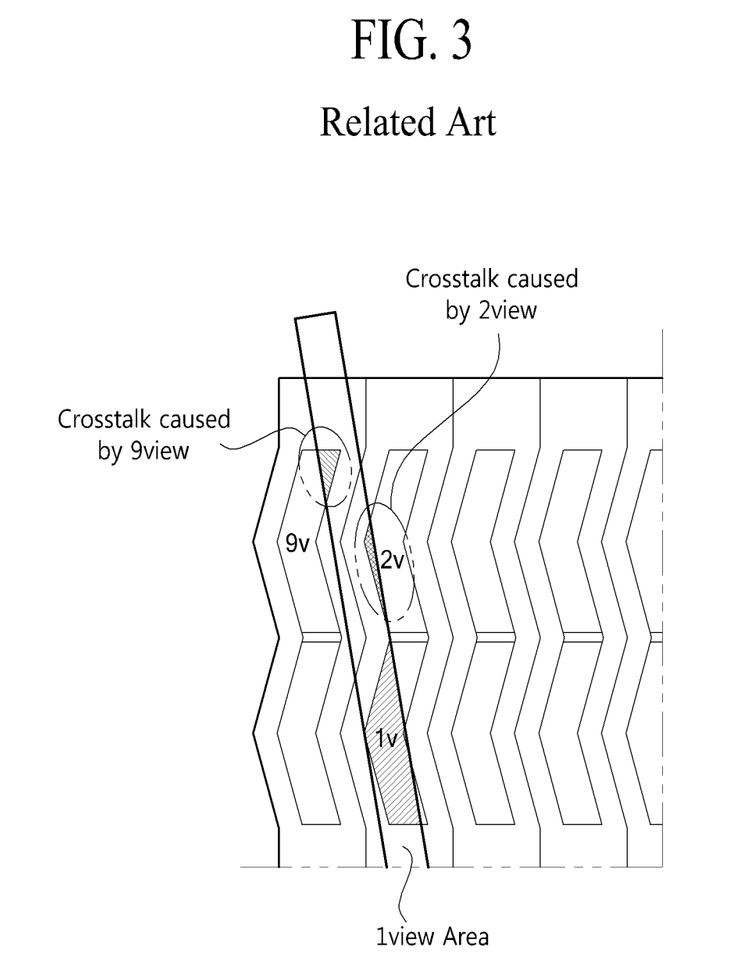
FIG. 3 is a diagram for describing a crosstalk problem in which when a lenticular lens is inclined at a certain angle and is adhered to a display panel of a 3D display device.

FIG. 3 is a diagram for describing a problem in which 3D crosstalk occurs when a lenticular lens is inclined at a certain angle and is adhered to a display panel.

With reference to FIG. 3, in a method for realizing a 2D/3D image using a lenticular film 20 fixed to a display panel, the lenticular film 20 is adhered to the display panel in a state of being inclined at a certain angle. As described above, when the lenticular film 20 is adhered to the display panel in a state inclined at a certain angle, in addition to one view, other additional views are shown to a viewer, and for this reason, 3D crosstalk occurs, causing a degradation in a quality of a 3D image.

Since a pitch width of a lenticular lens is widened depending on a size of a display panel, a gap glass or a gap film should be applied for maintaining an appropriate viewing distance.

Moreover, the lenticular film 20 is not freely bent, and it is unable to realize a sufficient depth sensation of a 3D image. For this reason, it is unable to realize a realistic 3D image in comparison with a 3D image based on a glasses type.

SUMMARY OF THE INVENTION

Accordingly, the present invention is directed to provide a stereoscopic image display device that substantially obviates one or more problems due to limitations and disadvantages of the related art.

An object of the present invention is to provide a stereoscopic image display device that can prevent 3D crosstalk.

Another object of the present invention is to provide a stereoscopic image display device in which a lenticular film is freely bent.

Another object of the present invention is to provide a stereoscopic image display device with high resolution and improved stereoscopic effect.

Another object of the present invention is to provide a stereoscopic image display device in which a gap glass or a gap film applied for maintaining an appropriate viewing distance of a 3D image is removed, thereby reducing the manufacturing cost and the thickness of the display.

Additional features and advantages of the invention will be set forth in the description which follows, and in part will become apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a stereoscopic image display device for displaying a 3D stereoscopic image includes a substrate having an array of pixels thereon; and a lenticular film on the substrate, wherein alternating rows of pixels are shifted so that open areas of pixels in adjacent rows are not overlapped with respect to the vertical direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Before describing specific embodiments with reference to the drawings, it is noted that display panels have been variously developed in a twisted nematic (TN) mode, a vertical alignment (VA) mode, an in-plane switching (IPS) mode, and a fringe field switching (FFS) mode according to a scheme of adjusting the alignment of liquid crystal. A method of driving a stereoscopic image display device according to an embodiment of the present invention may be applied to the TN mode, the VA mode, the IPS mode, and the FFS mode without being limited to a specific display mode, and may be applied to flat display panels in addition to liquid crystal panels. However, the present invention is not limited thereto, and, for example, an organic light emitting display panel in addition to a liquid crystal panel may be applied as a display panel according to embodiments of the present invention. A stereoscopic image display device according to embodiments of the present invention is for preventing 3D crosstalk from occurring, and as a result, details not directly related thereto are not described.

The stereoscopic display devices according to embodiments of the present invention enables a user to view a two-dimensional (2D)/3D image as a multi-view depending on a designed view map when viewing a 3D image using a glasses-free 3D display device with a lenticular film applied thereto.

Figure 4:
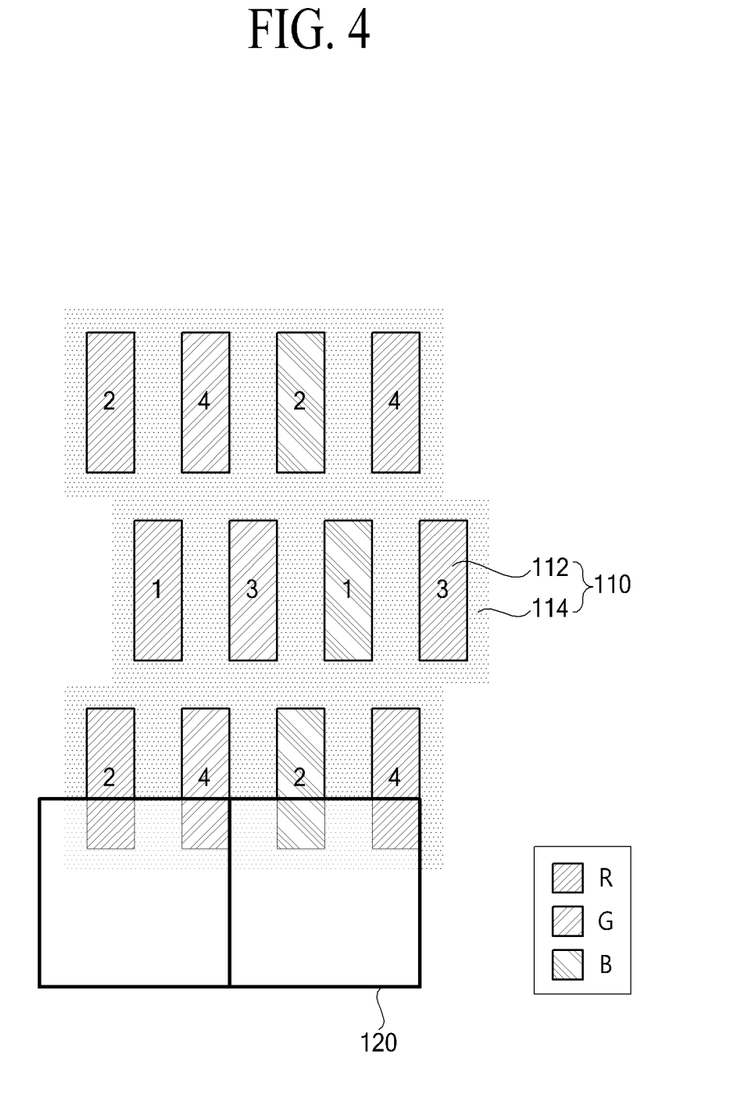
FIG. 4 is a diagram illustrating a stereoscopic image display device according to an embodiment of the present invention.
Figure 5:
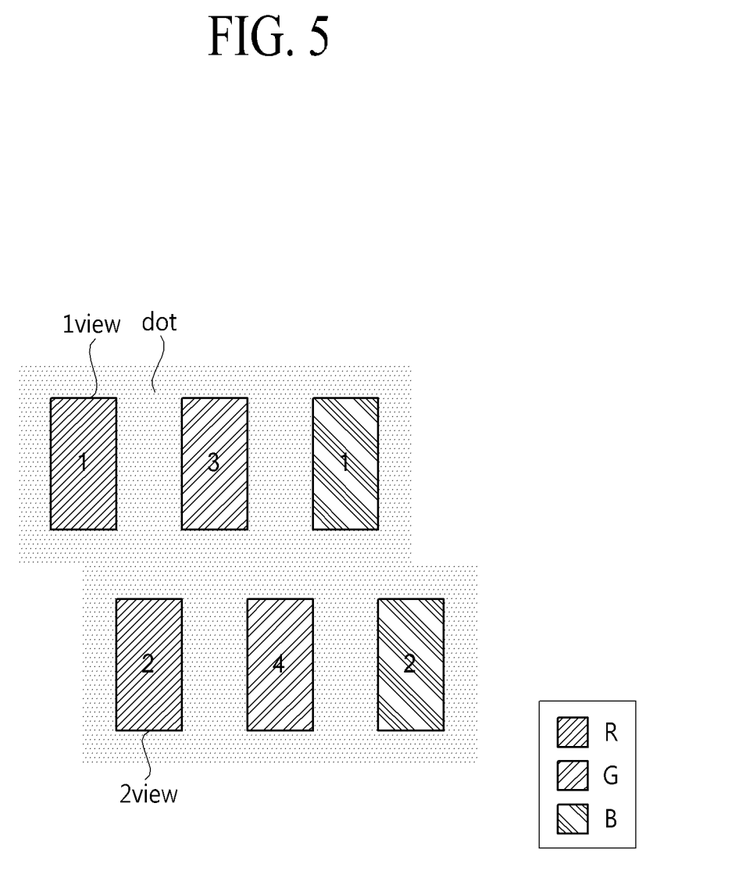
FIG. 5 is a diagram for describing that 3D crosstalk is prevented from occurring, and a quality of an image is degraded by bending of a lenticular lens film.

FIG. 4 is a diagram illustrating a stereoscopic image display device according to an embodiment of the present invention, and FIG. 5 is a diagram for describing that 3D crosstalk is prevented from occurring, and a quality of an image is degraded by bending of a lenticular lens film.

With reference to FIGS. 4 and 5, a pixel structure is illustrated in which a plurality of pixels is arranged for a user to view a 2D/3D image through a fourth view. When realizing a 2D/3D image using a glasses-free display device with a lenticular film applied thereto, a user can view a high-quality 2D/3D image without 3D crosstalk.

A plurality of pixels 110 are arranged in a matrix type in the display panel, and a lenticular film with a plurality of lenses 120 formed therein is adhered onto the display panel. In FIGS. 4 and 5, a backlight unit and a driving circuit unit are not illustrated. The driving circuit unit for driving a display panel may include a timing controller (T-con), a data driver (D-IC), a gate driver (G-IC), a backlight driver, and a power supply.

The display panel includes a lower substrate, which may be a thin film transistor (TFT) array substrate, an upper substrate, which may be a color filter array substrate, and a liquid crystal layer disposed therebetween.

The lower substrate (the TFT array substrate) includes a plurality of pixels defined by intersections between a plurality of data lines and a plurality of gate lines. Each of the plurality of pixels includes a TFT as a switching element, a storage capacitor (Cst), and a pixel electrode. The upper substrate (the color filter array substrate) includes a red (R) color filter, a green (G) color filter, and a blue (B) color filter. A common electrode corresponding to the pixel electrode formed on the lower substrate (the TFT array substrate) is formed on the upper substrate (the color filter array substrate).

A liquid crystal alignment direction of the liquid crystal layer is adjusted by an electric field generated between the pixel electrode and the common electrode. Thus, a transmittance of light incident from the backlight unit is adjusted, thereby displaying an image.

The display panel including the above-described elements drives the plurality of pixels with input image data to display an image. The plurality of pixels includes a plurality of red pixels, green pixels, and blue pixels. One unit pixel is configured with three color pixels, for example, a red pixel, a green pixel, and a blue pixel. Through such a pixel structure, the display panel displays an image. It should be apparent that embodiments are not limited to these colors.

In the stereoscopic image display device according to an embodiment of the present invention, a red pixel, a green pixel, and a blue pixel are arranged in a zigzag arrangement. Here, an opening width of the color filter (CF) array formed on the upper substrate is reduced, thereby adjusting a pitch of the lenticular lens. In realizing the same view, the pitch of the lenticular lens can be reduced, and a gap glass and a gap film can be removed.

Under the same lens pitch as that of the related art, a greater number of views are formed by changing a setting of view mapping. In detail, all pixels are arranged so that open areas of pixels arranged on an upper line accurately match open areas of pixels arranged on a lower line, on a vertical line.

A red pixel, green pixel, and a blue pixel are shifted by ½ of a width of one pixel. An open area of another view is not disposed, and a non-open area is disposed, just under an open area of a first-view pixel. Also, an open area of another view is not disposed, and a non-open area is disposed, just on the open area of the first-view pixel.

For example, an open area of a second view (2view) is disposed under a non-open area of a first view (1view). The open area of the first view (1view) is disposed under a non-open area of the second view (2view). An open area of a fourth view (4view) is disposed under a non-open area of a third view (3view). An open area of the third view (3view) is disposed under a non-open area of the fourth view (4view). Here, the first view is a view that enables a first viewer to view a 3D image, the second view is a view that enables a second viewer to view the 3D image, the third view is a view that enables a third viewer to view the 3D image, and the fourth view is a view that enables a fourth viewer to view the 3D image.

Here, the lenticular film is adhered in a vertical direction to a pixel without being inclined.

To remove 3D crosstalk and a line defect, an opening area may be set by dividing a width of a pixel by 1/n. By adjusting a viewing distance based on a width corresponding to a pixel, the gap glass and the gap film may be removed, or a thickness may be adjusted.

All the pixels are arranged in a zigzag type which is shifted by a ½ pixel width, and the lenticular film is vertically adhered to the display panel. Therefore, the gap between the dots of the plurality of lenses formed in the lenticular film is set to 0 (no gap), thereby preventing occurrence of bending.

Moreover, since the lenticular lens 120 is uprightly disposed in a vertical direction, the lenticular lens is inclined, and thus, an overlap of views can be fundamentally prevented. Therefore, a high-quality 3D image having a sensation of depth is realized at a level equal to a glasses 3D display device.

Figure 6:
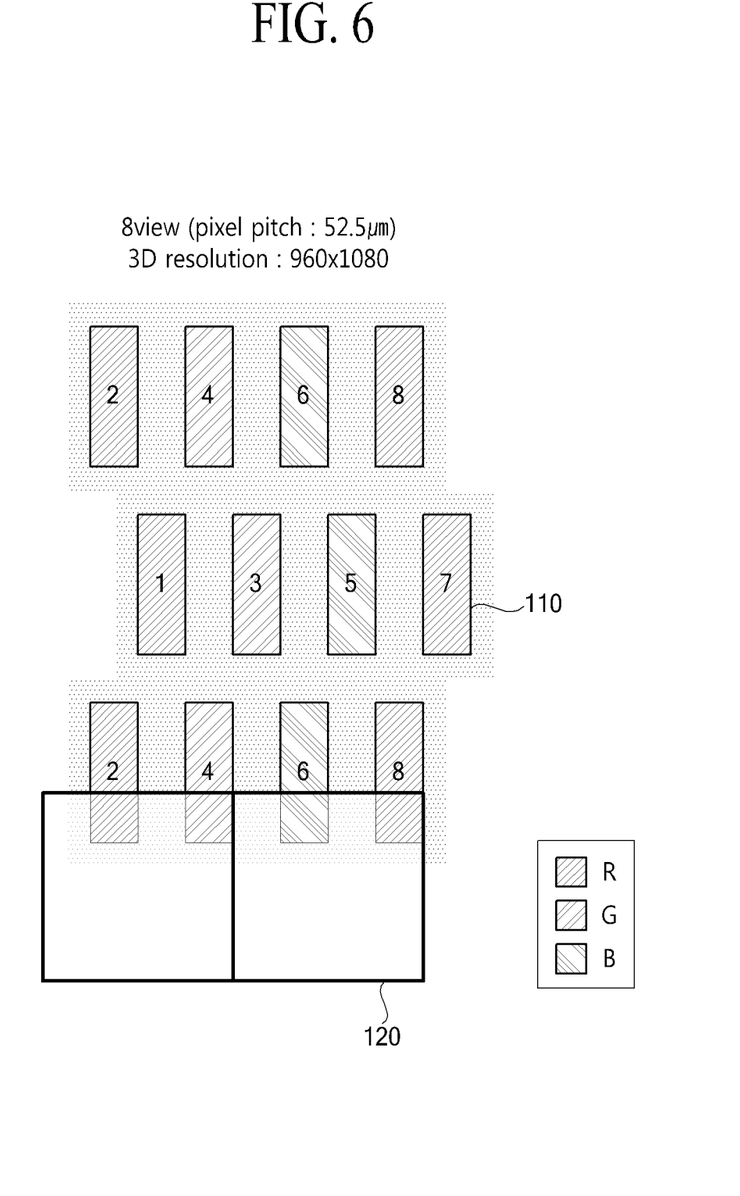
FIG. 6 is a diagram illustrating a stereoscopic image display device according to an embodiment of the present invention, and illustrates a pixel arrangement structure in implementing an eighth view and a 3D resolution of 960*1080.

FIG. 6 is a diagram illustrating a stereoscopic image display device according to an embodiment of the present invention, and illustrates a pixel arrangement structure in implementing an eighth view and a 3D resolution of 960*1080.

In FIG. 6, a red pixel, a green pixel, and a blue pixel are arranged in a zigzag type, for displaying an eighth-view 3D image at a 3D resolution of 960*1080. The lenticular film 120 is adhered in a direction vertical to a pixel without being inclined. In the pixel, a pitch may be formed to 52.5 μm.

All the pixels are formed so that open areas of pixels arranged on an odd-numbered horizontal line accurately match non-open areas of pixels arranged on an even-numbered horizontal line, on a vertical line. Moreover, all the pixels are formed so that non-open areas of the pixels arranged on the odd-numbered horizontal line accurately match open areas of the pixels arranged on the even-numbered horizontal line, with respect to a vertical direction.

In detail, all the pixels are formed so that open areas of pixels arranged on a first horizontal line accurately match non-open areas of pixels arranged on a second horizontal line, on the vertical line. The red pixel, the green pixel, and the blue pixel are shifted by ½ of a width of one pixel.

An open area of a second view (2view) is disposed under a non-open area of a seventh view (7view). An open area of a third view (3view) is disposed under a non-open area of the fourth view (4view).

An open area of a fourth view (4view) is disposed under a non-open area of the first view (1). An open area of a fifth view (5view) is disposed under a non-open area of a sixth view (6view).

An open area of a sixth view (6view) is disposed under a non-open area of a third view (3view). An open area of a seventh view (7view) is disposed under a non-open area of the eighth view (8view).

An open area of an eighth view (8view) is disposed under a non-open area of the fifth view (5view). The open area of the first view (1view) is disposed under a non-open area of the second view (2view).

Here, the gap between the dots of the plurality of lenses formed in the lenticular film 120 is set to 0 (no gap), and a pitch of the lenticular lens is formed to match a width of two pixels.

Here, if the pixels of adjacent rows are shifted by a ½ pixel width, the open areas of pixels of the respective views do not have any overlap with respect to the vertical direction. Also, the lenticular lens 120 is arranged vertically. Thus, there will be no crosstalk between pixels of different views. Further, there will be a consistent luminosity among the pixels of the respective views.

Figure 7:
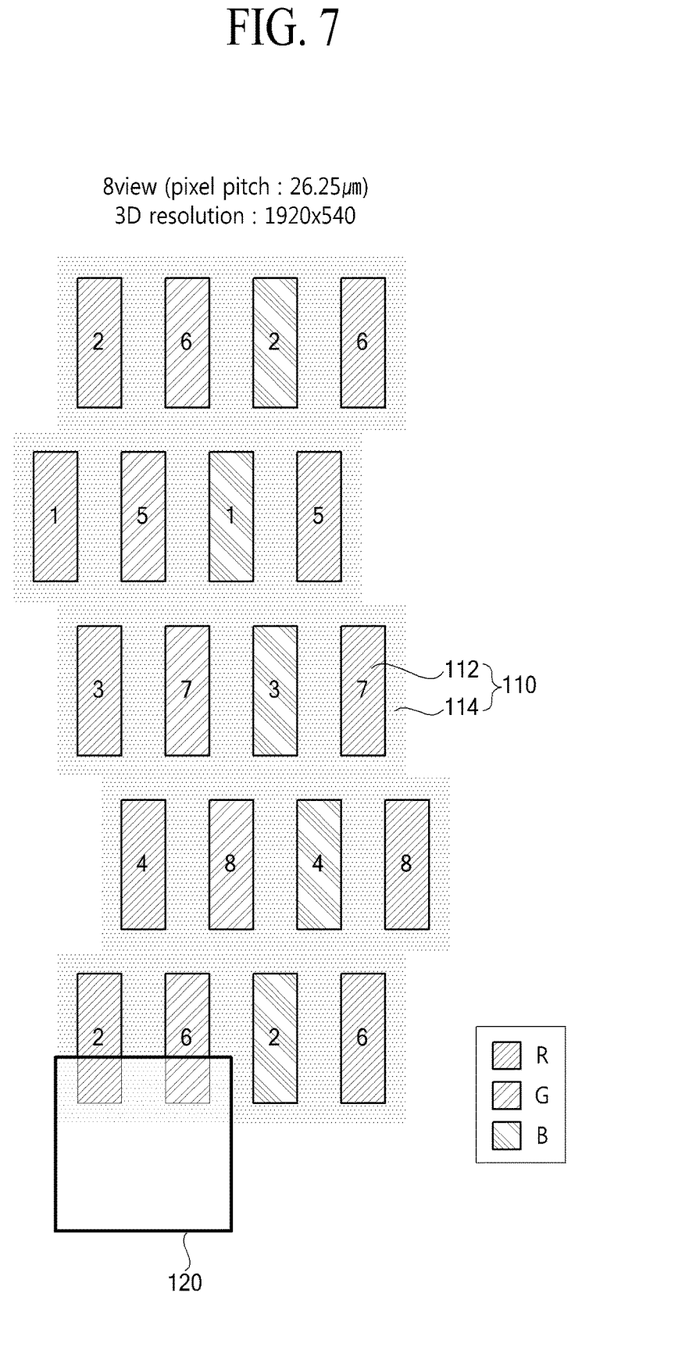
FIG. 7 is a diagram illustrating a stereoscopic image display device according to an embodiment of the present invention, and illustrates a pixel arrangement structure in implementing an eighth view and a 3D resolution of 1920*450.

FIG. 7 is a diagram illustrating a stereoscopic image display device according to an embodiment of the present invention, and illustrates a pixel arrangement structure in implementing an eighth view and a 3D resolution of 1920*450.

As shown in FIG. 7, a red pixel, a green pixel, and a blue pixel are arranged in a zigzag type, for displaying an eighth-view 3D image at a 3D resolution of 1920*450. The lenticular film 120 is adhered in a direction vertical to a pixel without being inclined. In the pixel, a pitch may be formed to 26.25 μm.

All the pixels are formed so that open areas of pixels arranged on an odd-numbered horizontal line accurately match non-open areas of pixels arranged on an even-numbered horizontal line, on a vertical line.

Moreover, all the pixels are formed so that non-open areas of the pixels arranged on the odd-numbered horizontal line accurately match open areas of the pixels arranged on the even-numbered horizontal line, on the vertical line.

In detail, all the pixels are formed so that open areas of pixels arranged on a first horizontal line accurately match non-open areas of pixels arranged on a second horizontal line, on the vertical line. The red pixel, the green pixel, and the blue pixel are shifted by ½ of a width of one pixel.

An open area of a third view (3view) is disposed under a non-open area of a first view (1view). An open area of a fifth view (5view) is disposed under a non-open area of the second view (2view).

An open area of a fourth view (4view) is disposed under a non-open area of the third view (3view). An open area of a sixth view (6view) is disposed under a non-open area of a fourth view (4view).

An open area of a seventh view (7view) is disposed under a non-open area of the fifth view (5view). An open area of the first view (1view) is disposed under a non-open area of the sixth view (6view).

An open area of an eighth view (8view) is disposed under a non-open area of the seventh view (7view). The open area of the second view (2view) is disposed under a non-open area of the eighth view (8view).

Here, the gap between the dots of the plurality of lenses formed in the lenticular film 120 is set to 0 (no gap), and a pitch of the lenticular lens is formed to match a width of two pixels.

In FIG. 7, because the pixels of adjacent rows are shifted by a ½ pixel width, the open areas of pixels in adjacent rows do not have any overlap with respect to the vertical direction. As a result, with the lenticular lens 120 arranged vertically, there will be a consistent luminosity.

Figure 8:
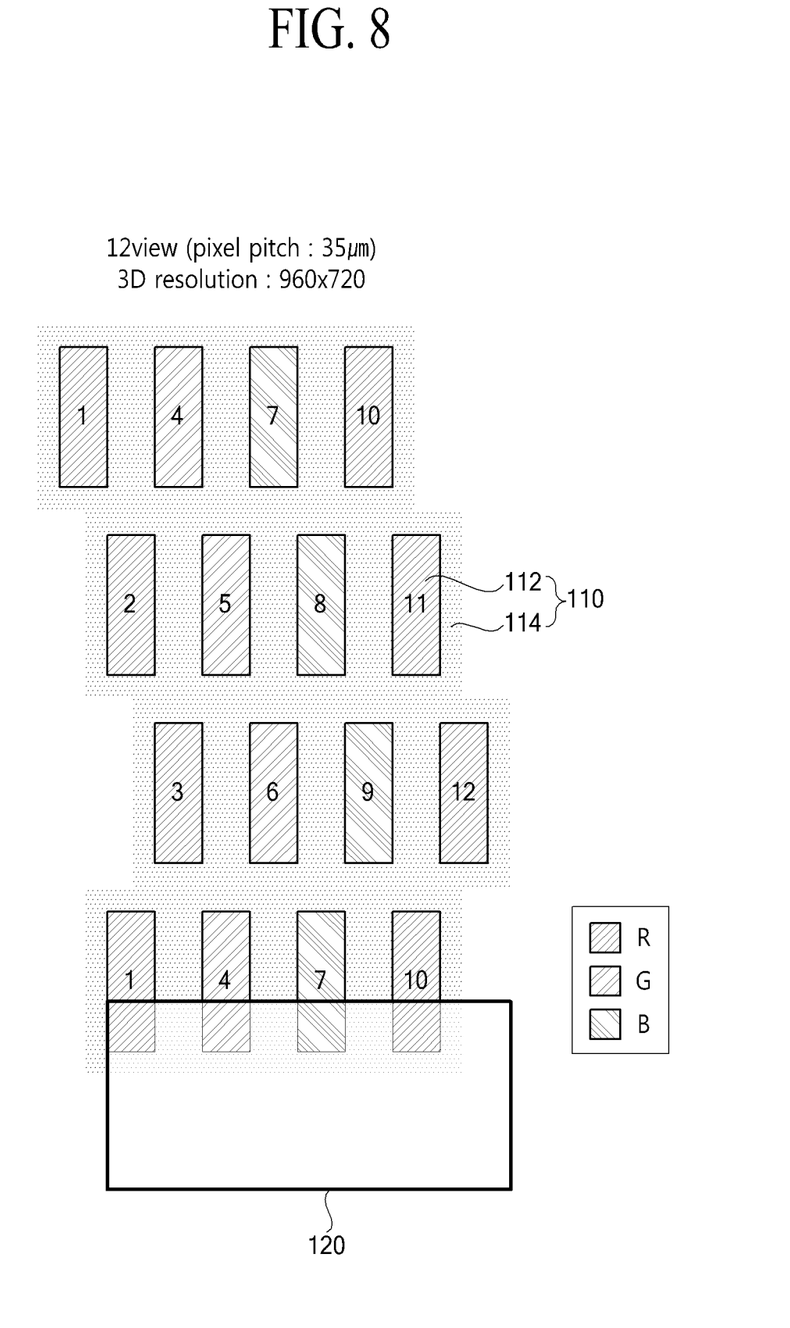
FIG. 8 is a diagram illustrating a stereoscopic image display device according to an embodiment of the present invention, and illustrates a pixel arrangement structure in implementing a twelfth view and a 3D resolution of 960*720.

FIG. 8 is a diagram illustrating a stereoscopic image display device according to an embodiment of the present invention, and illustrates a pixel arrangement structure in implementing a twelfth view and a 3D resolution of 960*720.

As illustrated in FIG. 8, a red pixel, a green pixel, and a blue pixel are arranged in a zigzag type, for displaying an eighth-view 3D image at a 3D resolution of 960*720. The lenticular film 120 is adhered in a direction vertical to a pixel without being inclined. In the pixel, a pitch may be formed to 35 μm.

All the pixels are formed so that open areas of pixels arranged on an odd-numbered horizontal line accurately match non-open areas of pixels arranged on an even-numbered horizontal line, on a vertical line.

Moreover, all the pixels are formed so that non-open areas of the pixels arranged on the odd-numbered horizontal line accurately match open areas of the pixels arranged on the even-numbered horizontal line, on the vertical line.

In detail, all the pixels are formed so that open areas of pixels arranged on a first horizontal line accurately match non-open areas of pixels arranged on a second horizontal line, on the vertical line. The red pixel, the green pixel, and the blue pixel are shifted by ½ of a width of one pixel.

An open area of a second view (2view) is disposed under a non-open area of a first view (1view). An open area of a third view (3view) is disposed under a non-open area of the second view (2view).

An open area of a fourth view (4view) is disposed under a non-open area of the third view (3view). An open area of a sixth view (6view) is disposed under a non-open area of a fourth view (4view).

An open area of the sixth view (6view) is disposed under a non-open area of a fifth view (5view). An open area of a seventh view (7view) is disposed under a non-open area of the sixth view (6view).

An open area of an eight view (8view) is disposed under a non-open area of a seventh view (7view). An open area of a ninth view (9view) is disposed under a non-open area of the eighth view (8view).

An open area of a tenth view (10view) is disposed under a non-open area of the ninth view (9view). An open area of an eleventh view (11view) is disposed under a non-open area of the tenth view (10view).

An open area of a twelfth view (12view) is disposed under a non-open area of the eleventh view (11view). An open area of the first view (1view) is disposed under a non-open area of the twelfth view (12view).

Here, the gap between the dots of the plurality of lenses formed in the lenticular film 120 is set to 0 (no gap), and a pitch of the lenticular lens is formed to match a width of two pixels.

In FIG. 8, because the pixels of adjacent rows are shifted by a ½ pixel width, the open areas of pixels in adjacent rows do not have any overlap with respect to the vertical direction. As a result, with the lenticular lens 120 arranged vertically, there will be a consistent luminosity.

As described above, embodiments of the present invention are not limited to that an open area of each view is formed to correspond to ½ of a width of a pixel. For example, an open area of each view may be formed to correspond to ⅓ or ¼ of a width of a pixel.

Figure 9:
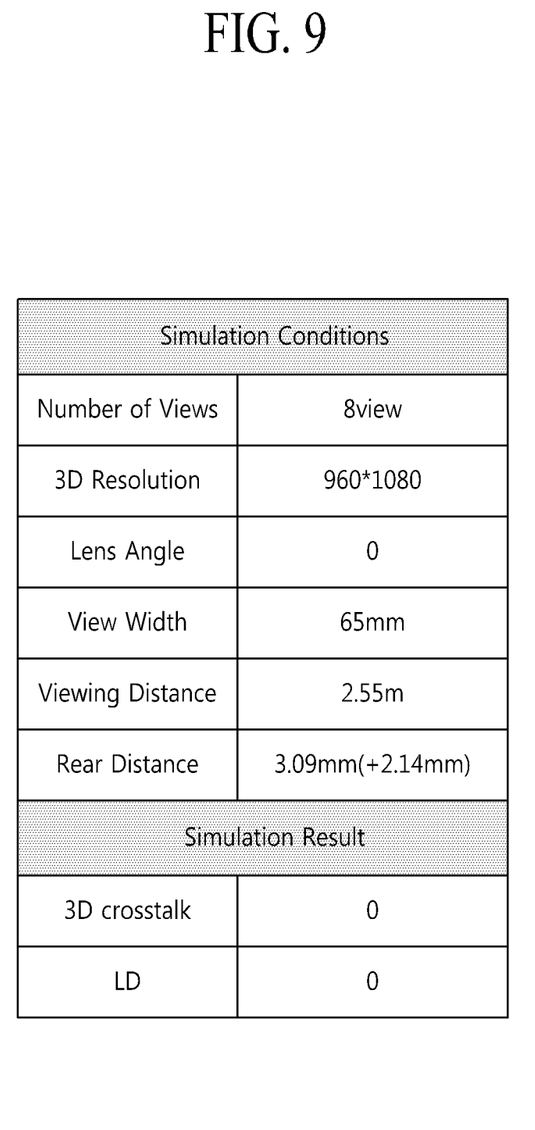
FIG. 9 is a diagram illustrating a 3D crosstalk simulation result of a stereoscopic image display device according to an embodiment of the present invention.

FIG. 9 is a diagram illustrating a 3D crosstalk simulation result of a stereoscopic image display device according to an embodiment of the present invention.

In the related art, a quality of an image is degraded due to bending of a lenticular film. Also, since the lenticular film is adhered to be inclined, one view overlap other views, causing 3D crosstalk.

On the other hand, as shown in FIG. 9, the stereoscopic image display device according to embodiments of the present invention can prevent 3D crosstalk (CT) and a line detect (LD) from occurring. In the stereoscopic image display device according to embodiments of the present invention, the gap glass or the gap film applied for maintaining an appropriate viewing distance of a 3D image is removed, thereby reducing manufacturing cost and product thickness.

In the stereoscopic image display device according to embodiments of the present invention, a high-quality 3D image having a sufficient sensation of depth is displayed.

According to embodiments of the present invention, the lenticular film is freely bent.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device for displaying a 3D stereoscopic image, comprising:
    a substrate having an array of pixels thereon, the pixels comprising first color pixels, second color pixels, and third color pixels; and
    a lenticular film on the substrate,
    wherein alternating rows of pixels are shifted so that open areas of pixels in adjacent rows are not overlapped with respect to a vertical direction,
    wherein the first, second, and third color pixels are arranged in respective adjacent, non-crossing zig-zag patterns with respect to the vertical direction.

2. The stereoscopic image display device according to claim 1, wherein the shifted rows of pixels are shifted by a distance substantially equal to half of a pixel separation distance.

3. The stereoscopic image display device according to claim 1, wherein open areas of pixels of one row are disposed corresponding to non-open areas of pixels of an adjacent row with respect to the vertical direction.

4. The stereoscopic image display device according to claim 1, wherein the pixels of a particular view are arranged in a zig-zag pattern with respect to the vertical direction.

5. The stereoscopic image display device according to claim 1, wherein the lenticular film includes lenticular lenses arranged vertically.

* * * * *